United States Patent

[11] 3,566,983

| [72] | Inventor | Ludwig Weickhardt |
| --- | --- | --- |
| | | Bovenden, Germany |
| [21] | Appl. No. | 863,906 |
| [22] | Filed | Oct. 6, 1969 |
| [45] | Patented | Mar. 2, 1971 |
| [73] | Assignee | Sartorius-Werke GmbH |
| | | Gottingen, Germany |
| [32] | Priority | Oct. 9, 1968 |
| [33] | | Switzerland |
| [31] | | G15 281/68 |

[54] OPTICAL LEVEL COMPENSATOR FOR PRECISION AND FINE BALANCES
8 Claims, 5 Drawing Figs.

[52] U.S. Cl. .................................................. 177/173,
177/178, 177/216
[51] Int. Cl. ..................................................... G01g 23/14,
G01g 23/32, G01g 1/02
[50] Field of Search .......................................... 177/164,
173, 178, 216, (P.E. Dig.)

[56] References Cited
UNITED STATES PATENTS

| 2,244,523 | 6/1941 | Hess ............................ | 177/178 |
| 3,150,730 | 9/1964 | Baur ............................ | 177/178 |
| 3,458,003 | 7/1969 | Garvey ........................ | 177/164X |

FOREIGN PATENTS

| 501,633 | 1/1920 | France ........................ | 177/178 |

Primary Examiner—Robert S. Ward, Jr.
Attorney—Edmund M. Jaskiewicz

ABSTRACT: A level compensator for a precision and fine balance comprising a balance frame, a balance beam, a support for said beam, a microscale provided on the beam, a screen, and a projection apparatus for the reproduction of a section of the microscale on said screen. The level compensator comprises a pendulum provided on the balance frame for automatic level compensation. The support axis of the pendulum is arranged parallel to the support axis of the balance beam. A light reflecting member is situated on the pendulum and deflects the projection light beam. The center of gravity of the pendulum lies above an imaginary horizontal plane comprising the pendulum support axis and a spring arrangement acts on the balance frame and on the pendulum beyond the support axis thereof whereby the torque exerted by the spring arrangement on the pendulum counteracts the torque brought about by the center of gravity of the pendulum.

The center of gravity of the pendulum lies laterally above the support axis of the pendulum.

An adjusting weight is adjustable in relation to the support axis of the pendulum.

OPTICAL LEVEL COMPENSATOR FOR PRECISION AND FINE BALANCES

BACKGROUND OF THE INVENTION

The invention relates to a level compensator for a precision and fine balance comprising a balance frame, a balance beam, a support for said beam, a microscale provided on the beam, a screen and a projection apparatus for the reproduction of a section of the microscale on said screen. The level compensator comprises a pendulum provided on the balance frame for automatic level compensation the support axis of the pendulum being arranged parallel to the support axis of said support of beam, a light-reflecting member situated on the pendulum which deflects the projection light beam.

In a known balance of this form (U.S. Pat. No. 3,150,730) a light-reflecting member in the form of a mirror is arranged at the lower end of a pendulum which is exposed only to the influence of the force of gravity. The mirror serves for the deflection of the projection light beam in accordance with the inclined position of the balance. However, the inclination of the mirror which can be achieved in this way is so slight that a very long optical path behind the mirror is needed in order to make the deflection effective for the indication. Since there is normally not sufficient space in a balance housing for an adequately long optical path, further deflection mirrors are necessary. The arrangement becomes complicated and expensive.

OBJECT OF THE INVENTION

The object of the present invention is to provide a level compensator for a balance which is simpler in construction and in which the light-reflecting member is tilted upon an inclined position of the balance by substantial angles, so that subsequently it suffices to provide a fairly short optical path.

Another object is to provide a level compensator for a spring balance in which the center of gravity of the pendulum lies at all times above an imaginary horizontal plane containing the support axis of the pendulum and in which the center of gravity of the pendulum is kept in this position by a spring.

A further object is to provide a level compensator for a spring balance in which the light-reflecting member, for example a mirror or prism, tilts by a greater angle than the angle to which the balance has tilted.

A still further object is to provide a level compensator for a spring balance in which a very simple device is provided which, in the case of impermissibly great tilts of the balance, completely interrupts the projection light beam, but in which the constructional expense to achieve this goal can be considerably reduced.

In accordance with the invention, this task is solved in that the level compensator comprises a pendulum provided on the balance frame for automatic level compensation. The support axis of the pendulum is arranged parallel to the support axis of the balance beam. A light reflecting member is situated on the pendulum and deflects the projection light beam. The center of gravity of the pendulum lies above an imaginary horizontal plane comprising the pendulum support axis and a spring arrangement acts on the balance frame and on the pendulum beyond the support axis thereof whereby the torque exerted by the spring arrangement on the pendulum counteracts the torque brought about by the center of gravity of the pendulum.

The center of gravity of the pendulum lies laterally above the support axis of the pendulum.

An adjusting weight is adjustable in relation to the support axis of the pendulum.

Whereas, in the case of the previously known device, the center of gravity of the pendulum carrying the projection apparatus lies below the support axis of the pendulum, in the case of the device of the invention the center of gravity of the pendulum lies, in the case of all the positions of the balance which are concerned, here, at all times above an imaginary horizontal plane containing the support axis of the pendulum. The center of gravity of the pendulum is kept in this position by a spring, even if the center of gravity of the pendulum were to find itself perpendicularly above the support axis of the pendulum, in other words in unstable equilibrium.

If the balance is now tilted by a small angle, as is for example the case when the base plate sags somewhat through the depositing of loads to one side of the balance or when the floor on which the table stands sags, then with the balance frame the support axis of the pendulum is deflected in relation to the fixed point of application of the spring, and also the pendulum itself assumes a different position. If the swing takes place in the direction such that the center of gravity of the pendulum now has a bigger horizontal spacing from the support axis of the pendulum, then the pendulum exerts a greater torque, and the spring is more severely tensioned than previously. The reverse applies to the opposite direction of swing. In each case, this arrangement has the effect that the pendulum, and therewith the mirror or the prism, swings by a greater angle than the balance has been swung. This effect is necessary in order to deflect to a sufficient extent the light beam of the projection system for the compensation of the levelling error.

The above comments apply to tilts of the balance about an axis which extends parallel to the axis of the balance beam and pendulum support, as well as to tilts of which at least one component has such an axis of rotation. In the case of the small levelling errors considered here, it is sufficient if swings of up to about 1° are automatically compensated. Swings of this magnitude, which occur about an axis which is horizontal but perpendicular to the beam axis, can remain unconsidered.

Preferably the center of gravity of the pendulum does not lie perpendicularly, but laterally above the support axis of the pendulum.

The correction by the pendulum is sufficiently accurate only within specific tilting angles. In the case of tilting angles which become greater, care must be taken to see that the attention of the operator is drawn to the too severe tilting.

It is known (Swiss Pat. No. 447,641) to let the projection light beam fall near the microscale through an apertured diaphragm, whereby, in the case of too great tilts of the balance, the apertured diaphragm is swung in such a way that the light beam is completely interrupted by diaphragm parts beyond the hole. However, this diaphragm is provided separately on the balance frame, whilst, for the correction of small tilts, the projection lens is accommodated on a pendulum which is moreover provided. This arrangement is therefore comparatively expensive.

In contrast, in a further development of the invention a very simple device is provided which, in the case of impermissibly great tilts of the balance, also completely interrupts the projection light beam, but in which the constructional expense to achieve this goal can be considerably reduced.

This is solved in that a diaphragm is provided on the pendulum which, with the pendulum is swingable jointly transversely to the projection light beam in a path near the microscale or the projecting lens in such a manner that it interrupts the light beam upon an impermissibly severe tilting of the balance about an axis parallel to the beam axis.

By mounting the diaphragm on the pendulum itself, the constructional expense is kept extremely low. Because the diaphragm engages into the projection light beam near the microscale or the projection lens, a small swinging of the diaphragm is sufficient in order to interrupt the light beam completely, since at this point the light beam has a comparatively small cross section. In addition, the pendulum makes, in the case of a tilting of the balance, a greater swing than the balance.

DETAILED DESCRIPTION OF THE APPARATUS

Figure 1:
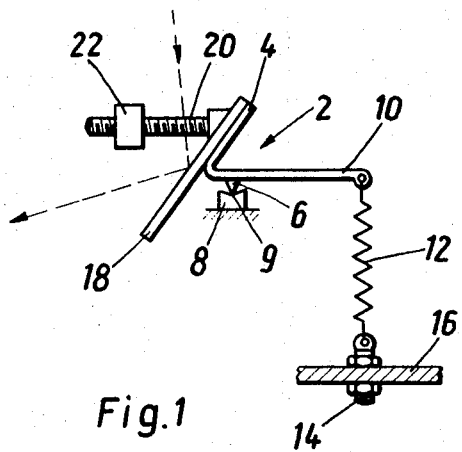
FIG. 1 shows, in side view, a level compensator in accordance with the invention.

In FIG. 1 the pendulum is designated as a whole by 2. It has a plate 4, which is bent to form an angle piece and carries a supporting knife edge 6. The knife edge rests in a saucer 8 fastened to a balance frame. The knife edge line 9 of this bearing extends parallel to the support axis of the balance beam (not shown).

The bent part of the plate 4 terminates at the right as viewed in an arm 10, on the outer end of which the helical tension spring 12 is situated. The other end of the spring is fastened adjustably with the lid of a setscrew 14 to the base plate 16 of the balance.

Secured to the upper part of the plate 4 is the mirror 18. Alternatively, instead of the mirror, a prism could be stuck on the plate. Beside the mirror (in FIG. 1 behind the mirror), there is fastened to the plate 4 a setscrew 20, onto which an adjusting weight 22 is screwed.

Figures 2, 3:
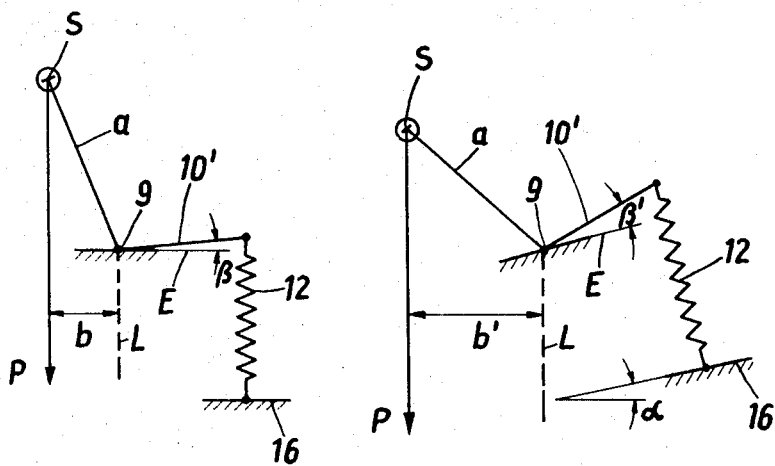
FIGS. 2 and 3 show diagrammatically the method of operation upon the tilting of the balance.

The method of operation already described above will be illustrated here more explicitly with reference to FIGS. 2 and 3. There one can perceive the knife edge line 9 of the pendulum and the spring 12. Instead of the arm 10, a connecting straight line 10' is drawn in from the cutting line to the point of application of the spring 12. With the balance leveled (FIG. 2) the connecting straight line connecting two points forms an angle $\beta$ with a fixed plane $E$, which extends parallel to the base plate. The mass of the pendulum is represented by the center of gravity $S$, which has a spacing $a$ from the cutting line 9.

The force of gravity $P$ acts perpendicularly on the center of gravity $S$. The force direction $P$ has a spacing $b$ from a perpendicular plane $L$ through the cutting line 9 (FIG. 2).

If the balance frame is now tilted by its base by an angle $\alpha$ anticlockwise in the position in accordance with FIG. 3, then the base plate 16 and the plane $E$ swing jointly. The center of gravity therewith tilts downwards about the knife edge line 9. The spacing $b$ is increased to $b'$. The torque acting about the support line 9 therewith increases from $Pb$ to $Pb'$. A greater force then acts on the spring 12, so that the spring is somewhat extended. By this means, however, the angular position of the pendulum in relation to the balance frame is increased. Thus the angle B of FIG. 2 has increased to $\beta'$ in FIG. 3. The overall angle of swing of the pendulum is $\alpha + \beta' - \beta$, in other words greater than $\alpha$.

The mirror thus makes a greater swing than the balance frame, which is necessary if one wishes to achieve the level compensation by swinging a single beam-displacing member.

The same applies to a swing in the opposite direction, which will be immediately perceived if one considers FIG. 3 as the initial position. If, namely, the balance frame is swung clockwise by the angle $L$, then the mirror swing with the pendulum once more by the angle $\alpha + \beta' - \beta$, in other words by more than $\alpha$.

The correct initial position of the mirror can be adjusted by actuating the setscrew 14. For the adjusting of the desired angle of swing, the position of the center of gravity $S$ in relation to the knife edge line 9 can be changed by operating the adjusting weight 22.

The reflecting plane of the mirror or prism is arranged so close to the knife edge line that the incident light beam, even after the highest permissible swing, still falls on the reflecting surface. For this purpose, the reflecting surface does not absolutely need to pass through the knife edge line. On the contrary, it is sufficient if a small gap is present between the two, which simplifies the construction of the device.

Figure 4:
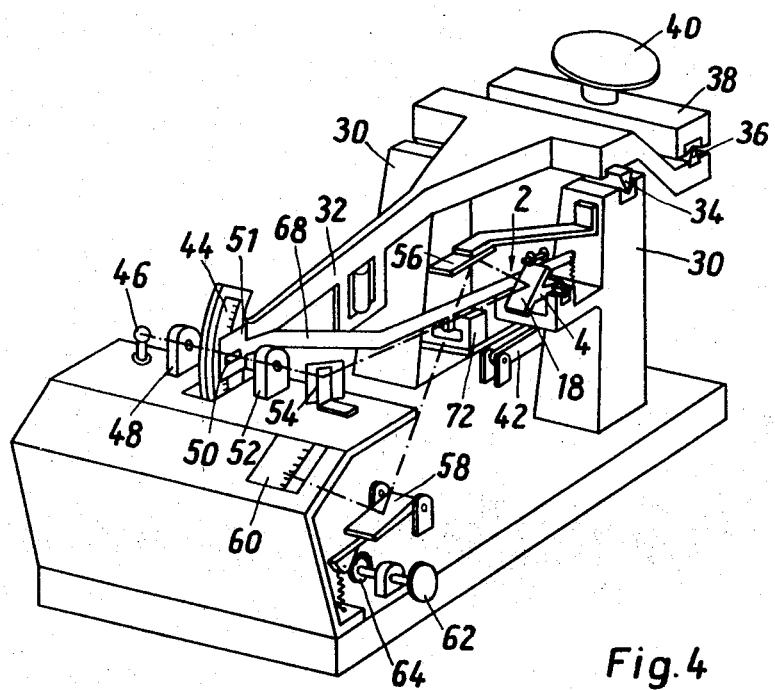
FIG. 4 shows, in perspective view, a balance with a level compensator in accordance with the invention, which is provided with a diaphragm and a damping device.
Figure 5:
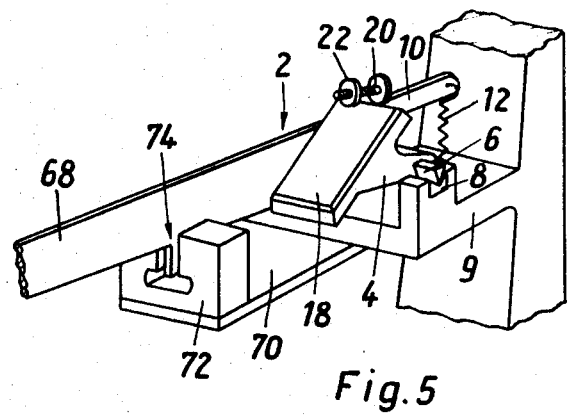
FIG. 5 shows, enlarged, a section from FIR. 4.

FIGS. 4 and 5 show the arrangement of a diaphragm and of a damping device on the pendulum and the accommodation of the pendulum in a balance. The lower end of the spring 12 acts, in this case, on an arm 9 of the balance frame.

The balance beam 32 rests with its supporting knife edges 34 on two supports 30 of the balance frame. A load dish support 38 with the load dish 40 rests in known manner on load knife-edges 36 of the beam. The dish carrier 38 is guided perpendicularly parallel by a parallelogram linkage of which a guide rod 42 can be seen. Provided on the front end of the balance beam is the microscale plate 44.

The center beam of the projection light beam is drawn-in in dot-dash lines. The light beam runs from a light source 46 through a condenser 48, the microscale plate 44 and through a slot 50 of the diaphragm 51 in accordance with the invention and the stationary projection lens 52. The beam is deflected by a stationary mirror 54 against the mirror 18 of the pendulum 2. From this latter the light beam runs to a further stationary mirror 56, then to a mirror 58 and from this latter to the ground glass plate 60. The mirror 58 is adjustable by a hand 62 and an eccentric 62 for the zero position of the projected scale section.

The diaphragm 51 is located on the outermost end of an arm 68, which is connected torsionally strong to the pendulum body 4. With each movement of the pendulum, the arm 68 is therefore swung. Upon an excessively large tilting of the balance, the light beam is completely masked by a part of the diaphragm 51 beyond the slot 50. The slot extends in the direction of the scale lines of the microscale 44, in other words approximately horizontally.

The width, in other words in height of the slot, can be made adjustable, for example in that situated perpendicularly adjustable on the diaphragm 51 is a plate, the one edge of which forms the upper or lower boundary of the slot 50. By this means the slot width can be adapted to the limit of error permissible for the balance, so that the light beam is reliably interrupted upon a tilting of the balance exceeding the permissible variation.

An eddy-current brake is provided for damping the pendulum movements. For this purpose, a permanent magnet 72, is fastened on a plate 70, which is connected securely to the arm 9. Between the poles of the magnet 72 a platelike extension 74 of the arm 68 is movable perpendicularly. Preferably the entire arm 68 including the extension 74 is manufactured from copper sheet.

The invention is not confined to any strict conformity to the showing in the drawings but changes or modifications may be made therein so long as such changes or modifications mark no material departure from the spirit and scope of the appended claims.

I claim:

1. A level compensator for precision and fine balances comprising a balance frame, a balance beam, a support for said beam, a microscale provided on the beam, a screen and a projection apparatus for the reproduction of a section of the microscale on said screen, the level compensator comprising a pendulum on said balance frame, the support axis of the pendulum being arranged parallel to the support axis of said support of said beam, a light reflecting member on the pendulum which deflects the projection light beam, the center of gravity of the pendulum lying above in imaginary horizontal plane comprising the pendulum support axis, and a spring arrangement which acts on the balance frame and on the pendulum beyond the support axis thereof whereby the torque exerted by it on the pendulum counteracts the torque brought about by the center of gravity of the pendulum.

2. A level compensator as claimed in claim 1, wherein said light reflecting member is a mirror.

3. A level compensator as claimed in claim 1, wherein the center of gravity of the pendulum lies laterally above the support axis of the pendulum.

4. A level compensator as claimed in claim 1, wherein there is arranged on the pendulum an adjusting weight which is adjustable in relation to the support axis of the pendulum.

5. A level compensator as claimed in claim 1, further comprising a setting device arranged between one end of said spring and its point of application, the setting device acting in the longitudinal direction of the spring.

6. A level compensator as claimed in claim 1 further comprising a diaphragm situated on the pendulum and swingable jointly with the pendulum transversely to the projection light beam in a path near the microscale or the projecting apparatus in such a manner that it interrupts the light beam upon an impermissibly severe tilting of the balance about an axis parallel to the beam axis.

7. A level compensator as claimed in claim 6, wherein the diaphragm is designed as a diaphragm formed with a slot which extends in the longitudinal direction of the scale lines of the microscale.

8. A level compensator as claimed in claim 7, wherein the effective width of the slot is adjustable for adaptation to the permissible limit of error of the balance.